May 25, 1937.    G. G. GREULICH    2,081,811
BEARING CAP
Filed Sept. 27, 1934
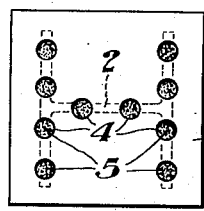
Fig.1.
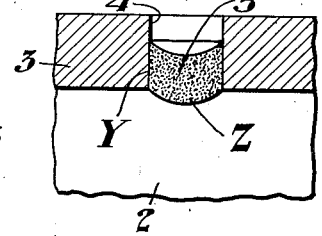
Fig.3.
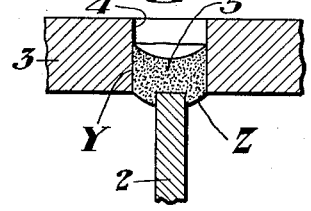
Fig.4.
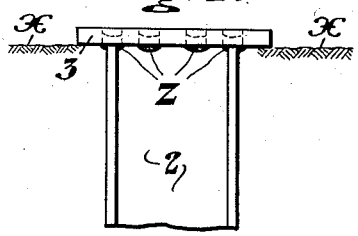
Fig.2.
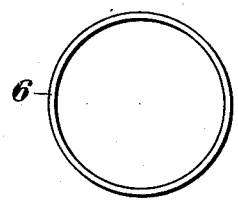
Fig.5
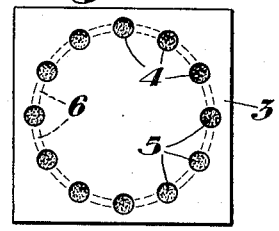
Fig.5ª
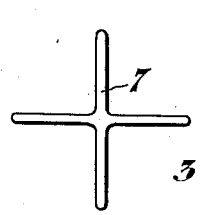
Fig.6
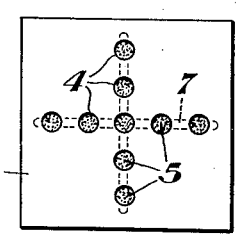
Fig.6ª
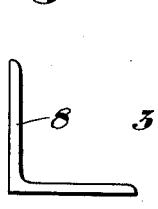
Fig.7
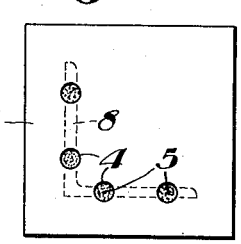
Fig.7ª
Fig.8
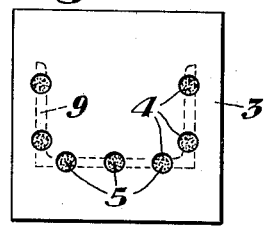
Fig.8ª
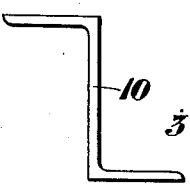
Fig.9
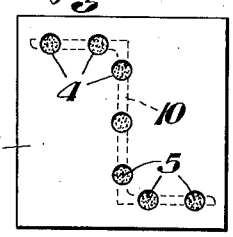
Fig.9ª
Inventor:
GERALD G. GREULICH,
by Usina & Rauber
his Attorneys.

Patented May 25, 1937

2,081,811

UNITED STATES PATENT OFFICE 2,081,811

BEARING CAP

Gerald G. Greulich, Mount Lebanon, Pa.

Application September 27, 1934, Serial No. 745,796

1 Claim. (Cl. 189—42)

This invention relates to a bearing cap and more particularly to those such as are used on piles and other structural shapes.

In erecting structures of various types, considerable difficulty is encountered in attaching bearing caps to the ends of the structural members. It quite frequently happens that the end of the structural member to be capped is just at the ground line and, therefore, relatively inaccessible. This is particularly true if the ground is in a muddy state. Under these and other conditions equally as difficult, the welding of bearing caps to the ends of structural shapes is a troublesome operation.

It is among the objects of the present invention to provide a novel bearing cap which may be attached to the end of a structural member regardless of its shape or disposition; by a method which is very rapid and economical.

Other objects will be apparent after referring to the drawing, in which:

Figure 1 is a plan of the device of the invention as attached to the end of a conventional I-beam.

Figure 2 is an elevation.

Figure 3 is an enlarged fragmentary sectional elevation.

Figure 4 is a view similar to Figure 3 but taken at right angles with respect thereto.

Figure 5 is a plan view of a cylindrical structural member prior to the attachment of the bearing cap;

Figure 5ª is a plan view showing the bearing cap attached to the structural member of Figure 5;

Figure 6 is a plan view of a star-shaped structural member prior to the attachment of the bearing cap;

Figure 6ª is a plan view showing the bearing cap attached to the structural member of Figure 6;

Figure 7 is a plan view of an angle-shaped structural member prior to the attachment of a bearing cap;

Figure 7ª is a plan view showing the bearing cap attached to the structural member of Figure 7;

Figure 8 is a plan view of a channel-shaped structural member prior to the attachment of the bearing cap;

Figure 8ª is a plan view showing the bearing cap attached to the structural member of Figure 8;

Figure 9 is a plan view of a Z-shaped structural member prior to the attachment of the bearing cap; and Figure 9ª is a plan view showing the bearing cap attached to the structural member of Figure 9.

Referring more particularly to the drawing, the numeral 2 designates a conventional H-beam such as those widely used for construction purposes. As indicated at X, the end of the H-beam 2, whether predeterminedly so or subsequently cut, is at approximately the ground level, which is ordinarily an extremely difficult position from which to attach a bearing cap, particularly if the ground is in a muddy state, as previously mentioned.

According to the teaching of the invention, the novel bearing cap 3 is rectangular in shape and provided with a series of apertures 4 which define the section of the end of the H-beam 2. The bearing cap 3 is placed on top of the H-beam 2 with the apertures 4 opening upon the ends of its section. A plug-weld 5 is made in each of the apertures 4, being united to the walls thereof as shown at Y, and to the ends of the section of the H-beam 2, as shown at Z.

Referring to Figure 5 of the drawing, the several apertures 4 are shown as defining the section of a cylindrical structural member 6; in Figure 6 of the drawing the series of apertures 4 are shown as defining the section of a star-shaped structural member 7; and in Figures 7, 8 and 9, the series of apertures 4 are shown as defining the section of an angle, channel and Z-bar, at 8, 9 and 10, respectively.

The apertures 4 may be formed in any suitable manner, either in the field or shop, and the plug-welds 5 which are made therein will be found to withstand the most strenuous service.

While I have shown and described several specific embodiments it is to be understood that I do not wish to be limited thereto, since various modifications may be made without departing from the scope of the invention, as set forth in the appended claim.

I claim:

A metallic building member for use in the transmittal of compressive stresses comprising, in combination, a metallic structural shape of a length materially greater than any other dimension thereof, said metallic structural shape having a flat end, a one-piece metallic bearing cap having a series of apertures which refine the cross-section of the flat end of said metallic structural shape, said apertures being arranged to open on the flat end of said metallic structural shape, the width of each aperture being greater than the width of that portion of the flat end of said metallic structural shape on which it opens, and a metallic plug secured in and extended from each of said apertures, the extended end of each of said metallic plugs being secured to the adjacent portion of the flat end of said metallic structural shape, the width of each of said metallic plugs being greater than the width of those portions of the flat end of said metallic structural shape to which they are secured.

GERALD G. GREULICH.